(12) United States Patent
Hattori et al.

(10) Patent No.: US 7,875,994 B2
(45) Date of Patent: Jan. 25, 2011

(54) DEVICE FOR PROTECTING PASSENGER IN VEHICLE

(75) Inventors: Hiroshi Hattori, Chita-gun (JP); Toshihiro Nishimura, Chiryu (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 11/999,458

(22) Filed: Dec. 5, 2007

(65) Prior Publication Data

US 2008/0136151 A1 Jun. 12, 2008

(30) Foreign Application Priority Data

Dec. 11, 2006 (JP) ............... 2006-333571

(51) Int. Cl.
*B60L 1/00* (2006.01)
*B60L 3/00* (2006.01)
(52) U.S. Cl. .................................... 307/10.1
(58) Field of Classification Search ............... 307/10.1
See application file for complete search history.

(56) References Cited

U.S. PATENT DOCUMENTS 7,230,814 B2 * 6/2007 Speiser ................... 361/248

2004/0164534 A1 8/2004 Higashiyama
2005/0269879 A1 12/2005 Hemon et al.

FOREIGN PATENT DOCUMENTS

| JP | 2000-085522 | 3/2000 |
|---|---|---|
| JP | 2005-239059 | 9/2005 |

* cited by examiner

*Primary Examiner*—Jared J Fureman
*Assistant Examiner*—Dru M Parries
(74) *Attorney, Agent, or Firm*—Harness, Dickey & Pierce, PLC

(57) ABSTRACT

An airbag device includes an airbag control IC constructed with a control signal generating circuit, a high-side switching element and a low-side switching element. Based on a signal for controlling the low-side switching element, on a signal for controlling a safety switching element and on a check mode signal, the control signal generating circuit adjusts the timing of the signal for controlling the high-side switching element so that the high-side switching element is turned on last. Therefore, the high-side switching element is turned on last. This suppresses the occurrence of an overshoot current.

15 Claims, 7 Drawing Sheets

DEVICE FOR PROTECTING PASSENGER IN VEHICLE

CROSS REFERENCE TO RELATED APPLICATION

This application is based on and incorporates herein by reference Japanese Patent Application No. 2006-333571 filed on Dec. 11, 2006.

FIELD OF THE INVENTION

This invention relates to a device for protecting a passenger in a vehicle.

BACKGROUND OF THE INVENTION

A device for protecting a passenger in a vehicle includes an airbag system disclosed in, for example, US 2004/0164534 (JP 2004255911A). This airbag system includes a safety switching element (safety switching element purpose), a high-side (high-potential side) switching element and a low-side (low-potential side) switching element formed in an integrated circuit (IC). The safety switching element, high-side switching element and low-side switching element are connected in series. The safety switching element is connected to a power source. Further, a squib is interposed between the high-side switching element and the low-side switching element.

When all the switching elements are driven to turn on, an electric current flows into the squib to ignite it. Accordingly, the airbag deploys to protect a passenger in the vehicle.

Usually, however, the high-side switching element connected on the high-side of the squib is so driven that a predetermined current flows into the squib. An overshoot current flows if the high-side switching element is driven earlier than the safety switching element or the low-side switching element. For example, when an electric current is fed to a plurality of squibs through the safety switching element, overshoot currents generated in the squibs are overlapped one upon the other and flow into the safety switching element. Therefore, it becomes necessary to use the safety switching element having a large rated current making it difficult to suppress the cost of the airbag system.

SUMMARY OF THE INVENTION

It is therefore an object to provide a device for protecting a passenger in a vehicle, in which the occurrence of overshoot current is suppressed to enable use of an inexpensive switching element of a small rated current as a safety switching element.

It is another object to provide a device for protecting a passenger in a vehicle, in which the overshoot current is suppressed by turning on last the switching element that has a function for controlling the electric current.

According to one aspect of the invention, a device for protecting a passenger in a vehicle includes an electric actuator such as a squib for an airbag, a plurality of switching elements and a control unit. The electric actuator is driven to protect a passenger when an electric current is supplied thereto. The switching elements are connected in series with the electric actuator and turned on to supply the electric current to the electric actuator. The control unit is connected between a collision sensor and the plurality of switching elements to turn on the switching elements in response to an output of the collision sensor. The control unit is constructed to turn on the plurality of switching elements at different time points in response to the output of the collision sensor, thereby restricting an overshooting current to flow.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
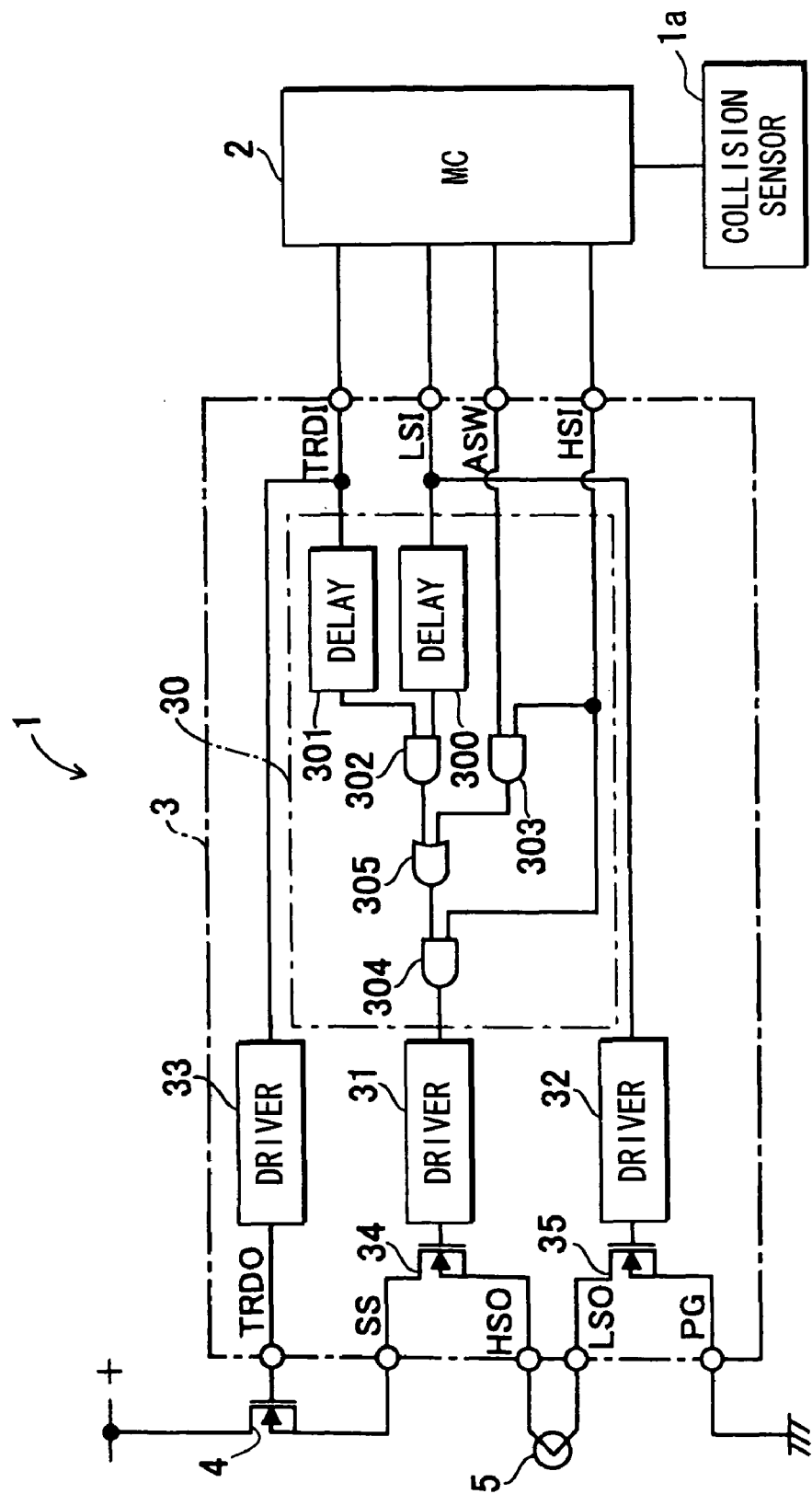
FIG. 1 is a circuit diagram of an airbag device as a device for protecting a passenger in a vehicle according to a first embodiment of the present invention.

Referring first to FIG. 1, an airbag device 1 (device for protecting a passenger) provided in a vehicle includes a microcomputer 2, an airbag control IC 3, a safety switching element 4, and a squib 5. The airbag control IC 3 includes a control signal generating circuit 30, driver circuits 31 to 33, a high-side switching element 34 as a first switching element and a low-side switching element 35 as a second switching element. The high-side switching element 34 operates as a current control switching element which controls an electric current supplied to the squib 5 to a predetermined value. The safety switching element 4 is provided as a third switching element.

The microcomputer 2 checks if the vehicle has collided based on an output of a collision sensor 1a, which may be an acceleration sensor installed on the vehicle. If it is so determined that the vehicle has collided, the microcomputer 2 produces control signals to control the high-side switching element 34, low-side switching element 35 and safety switching element 4. The microcomputer 2 produces a signal for controlling the high-side switching element 34, a signal for controlling the low-side switching element 35, and a signal for turning on the safety switching element 4. The microcomputer 2 further produces a check mode signal. The signal for controlling the high-side switching element 34 is a signal HIS for turning on the high-side switching element 34 via the control signal generating circuit 30 and the driver circuit 31. The signal for controlling the low-side switching element 35 and the signal for controlling the safety switching element 4 are signals LSI and TRDI for turning on the low-side switching element 35 and the safety switching element 4 via the driver circuits 32 and 33, respectively. The check mode signal is a signal ASW for checking the high-side switching element 34, low-side switching element 35 and safety switching element 4 at the initial moment. The output terminals of the microcomputer 2 are connected to the airbag control IC 3.

The airbag control IC 3 is for controlling the electric current flowing into the squib 5 based on the control signals produced by the microcomputer 2. The control signal generating circuit 30 controls the timing of signal for controlling the high-side switching element 34 based on various signals, that are the signal for controlling the low-side switching element 35, the signal for controlling the safety switching element 4 and the check mode signal, and produces a control signal for turning on the high-side switching element 34. The control signal generating circuit 30 includes delay circuits 300, 301, AND circuits 302, 303, 304, and an OR circuit 305.

The delay circuit 300 operates to delay the signal LSI for controlling the low-side switching element 35 by a predetermined period of time $T1s'$ which is longer than a turn-on time $T1s$ of the low-side switching element 35. The delay circuit 301 operates to delay the signal TRDI for controlling the safety switching element 4 by a predetermined period of time $Ttrd'$ which is longer than a turn-on time $Ttrd$ of the safety switching element 4. The input terminals of the delay circuits 300 and 301 are connected, through LSI terminal and TRDI terminal, to the output terminals of the microcomputer 2 that produces the signal for controlling the low-side switching element 35 and the signal for controlling the safety switching element 4. The two input terminals of the AND circuit 302 are connected to the output terminals of the delay circuits 300 and 301, respectively. The two input terminals of the AND circuit 303 are connected, via HSI terminal and ASW terminal, to the output terminals of the microcomputer 2 that produces the signal for controlling the high-side switching element 34 and the check mode signal. The two input terminals of the OR circuit 305 are connected to the output terminals of the AND circuits 302 and 303, respectively. The two input terminals of the AND circuit 304 are connected, via the output terminal of the OR circuit 305 and HSI terminal, to the output terminals of the microcomputer 2 that produces the signal for controlling the high-side switching element 34. The output terminal of the AND circuit 304 is connected to the driver circuit 31.

Based on the control signals that are input, the driver circuits 31 to 33 operate to drive the high-side switching element 34, low-side switching element 35 and safety switching element 4. The input terminal of the driver circuit 31 is connected to the output terminal of the control signal generating circuit 30, more specifically, to the output terminal of the AND circuit 304. The output terminal thereof is connected to the high-side switching element 34. The input terminal of the driver circuit 32 is connected to the output terminal of the microcomputer 2 that produces the signal LSI for controlling the low-side switching element 35 through the LSI terminal. The output terminal thereof is connected to the low-side switching element 35. The input terminal of the driver circuit 33 is connected to the output terminal of the microcomputer 2 that produces the signal TRDI for controlling the safety switching element 4 via the TRDI terminal. The output terminal thereof is connected to the safety switching element 4 via the TRDO terminal.

The high-side switching element 34 is a transistor which is connected to the high-side of the squib 5 and so operates to supply a predetermined electric current into the squib 5. More specifically, the high-side switching element 34 is a MOSFET. The drain of the high-side switching element 34 is connected to the safety switching element 4 via a SS terminal, the source thereof is connected to the squib 5 via a HSO terminal, and the gate thereof is connected to the output terminal of the driver circuit 31.

The low-side switching element 35 is a transistor which is connected to the low-side of the squib 5 to ground the squib 5. More specifically, the low-side switching element 35 is a MOSFET. The drain of the low-side switching element 35 is connected to the squib 5 via a LSO terminal, the source thereof is connected to the chassis of the vehicle via a PG terminal, and the gate thereof is connected to the output terminal of the driver circuit 32.

The safety switching element 4 is a transistor disposed between a power source (battery +) and the high-side switching element 34 of the airbag control IC 3, and operates to connect the power source to the high-side switching element 34. More specifically, the safety switching element 4 is a MOSFET. The drain of the safety switching element 4 is connected to the power source, the source thereof is connected to the drain of the high-side switching element 34 via the SS terminal, and the gate thereof is connected to the output terminal of the driver circuit 33 via the TRDO terminal.

The squib 5 is an element which ignites when a current flows therein to deploy or expand an airbag (not shown). An end on the high-side of the squib 5 is connected to the source of the high-side switching element 34 via the HSO terminal, and the other end on the low-side thereof is connected to the drain of the low-side switching element 35 via the LSO terminal.

Figure 2:
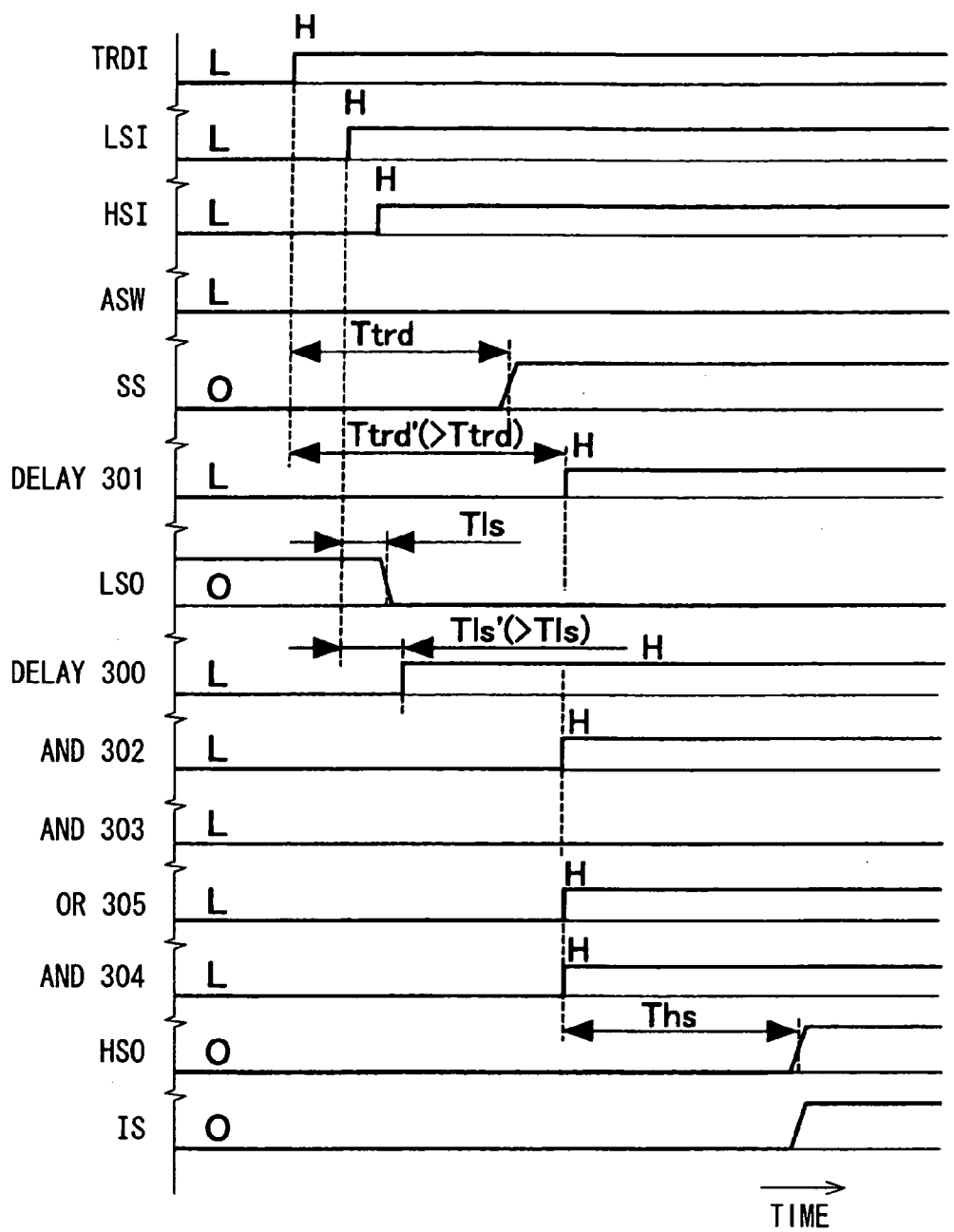
FIG. 2 is a time chart showing the operation of the airbag device of FIG. 1.

Next, the operation of the airbag device will be described with reference to FIGS. 1 and 2. When electric power (+) is supplied to operate the vehicle, the airbag device 1 also starts operating. In the initial period right after the start of operation, although not shown in FIG. 2, the microcomputer 2 produces the check mode signal ASW. Specifically, the check mode signal is caused to assume a H level (high level) from a L level (low level). Thereafter, the high-side switching element 34, low-side switching element 35 and safety switching element 4 are checked. After the end of checking, the microcomputer 2 no longer produces the check mode signal. Specifically, the check mode signal is caused to assume the L level from the H level.

The microcomputer 2 determines whether the vehicle has collided based on the output of the collision sensor 1a. If it is determined that the vehicle has collided, the microcomputer 2 successively produces the signal TRDI for controlling the safety switching element 4, the signal LSI for controlling the low-side switching element 35 and the signal HIS for controlling the high-side switching element 34 as shown in FIG. 2. Specifically, these control signals are caused to assume the H level from the L level.

If the signal TRDI for controlling the safety switching element 4 is output, the driver circuit 33 turns on the safety switching element 4. The safety switching element 4 turns on after the passage of its turn-on time $Ttrd$, and the voltage rises at the SS terminal.

If the signal LSI for controlling the low-side switching element 35 is output, the driver circuit 32 turns on the low-side switching element 35. The low-side switching element 35 turns on after the passage of its turn-on time $T1s$, and the voltage drops at the LSO terminal close to the ground level.

The control signal generating circuit 30 adjusts the timing of the signal HSI for controlling the high-side switching element 34 based on the signal for controlling the low-side switching element 35, on the signal for controlling the safety switching element and on the check mode signal.

The delay circuit 301 produces the signal for controlling the safety switching element 4 in a manner of being delayed by a predetermined period of time $Ttrd'$ ($>Ttrd$). The delay circuit 300 produces the signal for controlling the low-side switching element 35 in a manner of being delayed by a predetermined period of time $T1s'$ ($>T1s$). Here, the signal is output from the delay circuit 301 being delayed to be later than the output signal that is output from the delay circuit 300.

Specifically, the signal output from the delay circuit 301 assumes the H level being delayed to be later than the signal output from the delay circuit 300. Accordingly, the AND circuit 302 produces a signal in synchronism with the signal output from the delay circuit 301. Further, since the check mode signal has no longer been output, the AND circuit 303 produces no signal. Specifically, the output of the AND circuit 303 remains at the L level. Therefore, the OR circuit 305 simply produces the output signal of the AND circuit 302. The signal is output from the OR circuit 305 being delayed to be later than the signal HIS for controlling the high-side switching element 34. Specifically, the output signal of the OR circuit 305 assumes the H level being delayed to be later than the signal HIS for controlling the high-side switching element 34. Therefore, the AND circuit 304 produces a signal in synchronism with the OR circuit 305.

The driver circuit 31 turns on the high-side switching element 34 based on the output signal of the AND circuit 304. The high-side switching element 34 turns on after its turn-on time Ths, and the voltage rises at the HSO terminal. That is, the high-side switching element 34 turns on last. Therefore, an electric current Is flows into the squib 5 to ignite it, and the airbag expands to protect the passenger in the vehicle.

According to the first embodiment, the high-side switching element 34 is turned on last to suppress the occurrence of an overshoot current. It is therefore allowed to use an inexpensive switching element having a low rated current as the safety switching element 4.

Further, a signal for controlling the safety switching element 4 and a signal for controlling the low-side switching element 35 are output and, after predetermined periods of time Ttrd' and T1s' have passed, the AND circuit 304 produces a control signal to reliably turn on the high-side switching element 34 last.

Second Embodiment

Figure 3:
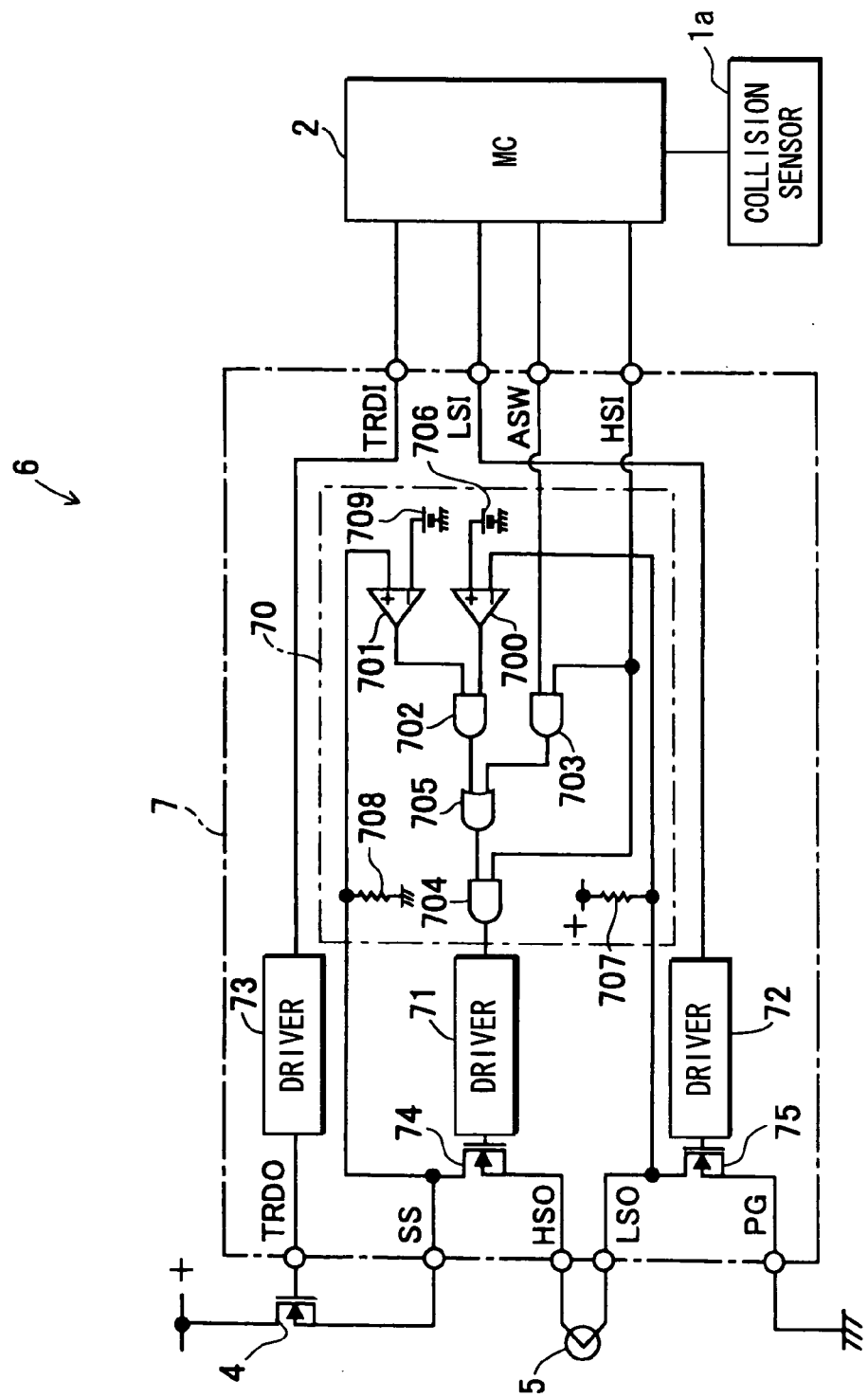
FIG. 3 is a circuit diagram of an airbag device according to a second embodiment of the present invention.

As shown in FIG. 3, an airbag device 6 of the second embodiment has a control signal generating circuit 70 which is different from that of the airbag device of the first embodiment. More specifically, the airbag device 1 of the first embodiment adjusts the control signal based on the turn-on times of the safety switching element 4 and of the low-side switching element 35. The airbag device 6 of the second embodiment determines the on-states of the safety switching element 4 and of the low-side switching element to adjust the control signal.

The airbag device 6 includes the microcomputer 2, an airbag control IC 7, the safety switching element 4 and the squib 5. The airbag control IC 7 includes the control signal generating circuit 70, driver circuits 71 to 73, high-side switching element 74 and low-side switching element 75.

The control signal generating circuit 70 adjusts the timing of the signal HIS for controlling the high-side switching element 74 based on the actual on/off-states of the low-side switching element 75 and of the safety switching element 4 and based on the check mode signal ASW, and produces a control signal for turning on the high-side switching element 74. The control signal generating circuit 70 includes comparators 700, 701, AND circuits 702 to 704, and OR circuit 705. The positive input terminal of the comparator 700 is connected to a reference power source 706. The voltage of the reference power source 706 is set to a predetermined voltage with which the on-state of the low-side switching element 75 can be determined. The negative input terminal is connected to the power source through a resistor 707 and is, further, connected to the LSO terminal. The positive input terminal of the comparator 701 is grounded via a resistor 708 and is, further, connected to the SS terminal. The negative input terminal thereof is connected to the reference power source 709. The voltage of the reference power source 709 is set to a predetermined voltage with which the turn-on state of the safety switching element 4 can be determined. Output terminals of the comparators 700 and 701 are connected to two input terminals of the AND circuit 702, respectively. The AND circuits 702 to 704 and the OR circuit 705 are the same as the AND circuits 302 to 304 and the OR circuit 305 of the first embodiment, and are not described here again.

In operation, the control signal generating circuit 70 adjusts the timing of the signal for controlling the high-side switching element 74 based on the actual on/off-states of the low-side switching element 75 and of the safety switching element 4, and based on the check mode signal ASW.

The comparator 701 compares the input voltage at the SS terminal with the voltage of the reference power source 709. If the voltage at the SS terminal is lower than the voltage of the reference power source 709, the output of the comparator 701 remains at the L level. If the voltage at the SS terminal becomes greater than the voltage of the reference power source 709, on the other hand, the comparator 701 determines that the safety switching element 4 is turned on, and causes the output to assume the H level from the L level.

The comparator 700 compares the input voltage at the LSO terminal with the voltage of the reference power source 706. If the voltage at the LSO terminal is greater than the voltage of the reference power source 706, the output of the comparator 700 remains at the L level. If the voltage at the LSO terminal becomes smaller than the voltage of the reference power source 706, on the other hand, the comparator 700 determines that the low-side switching element 75 is turned on, and causes the output to assume the H level from the L level. Here, the safety switching element 4 is turned on being delayed to be later than the low-side switching element 75. Therefore, the AND circuit 702 produces a signal in synchronism with the output signal of the comparator 701.

The AND circuits 703, 704 and the OR circuit 705 operate in the same manner as the AND circuits 303, 304 and the OR circuit 305, and are not described here again.

According to the second embodiment, it is determined that the safety switching element 4 and the low-side switching element 75 are in the on-state, and then the AND circuit 704 produces the control signal to reliably turn on the high-side switching element 74.

Further, the voltages at the SS terminal and the LSO terminal are compared with the voltages of the reference power sources 709 and 706 to reliably determine the actual on-states of the safety switching element 4 and of the low-side switching element 75. The safety switching element 4, upon being turned on, connects the high-side switching element 74 to the power source. Therefore, the on-state can be reliably determined relying on the terminal voltage on the side of the high-side switching element 74, i.e., relying on the voltage at the SS terminal. Further, the low-side switching element 75, upon being turned on, grounds the low-side of the squib 5. Therefore, the on-state can be reliably determined depending upon the terminal voltage on the side of the squib 5, i.e., depending upon the voltage at the LSO terminal.

Third Embodiment

Figure 4:
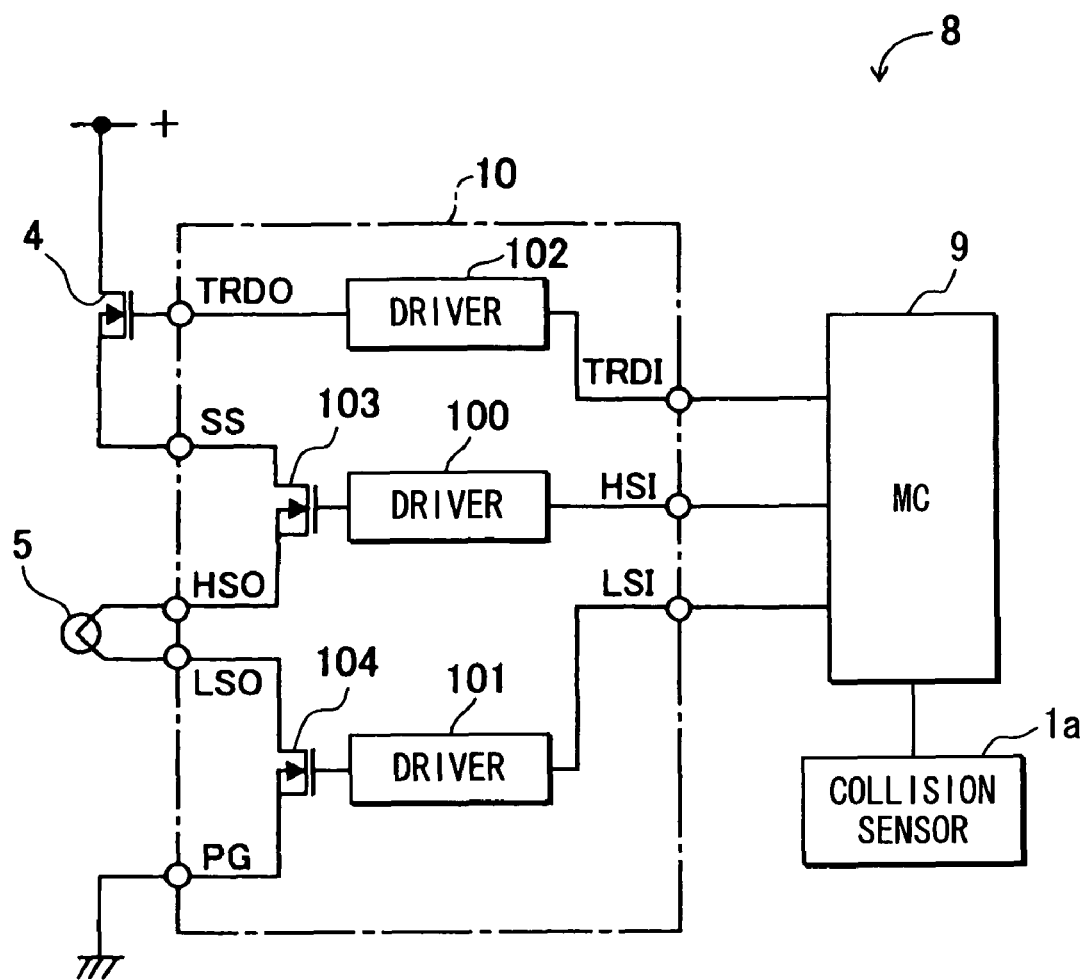
FIG. 4 is a circuit diagram of an airbag device according to a third embodiment of the present invention.

As shown in FIG. 4, an airbag device 8 according to a third embodiment includes a microcomputer 9 which is programmed to perform the same function of the control signal generating circuit 30 of the first embodiment.

The airbag device 8 includes the microcomputer 9, an airbag control IC 10, the safety switching element 4 and the squib 5. The airbag control IC 10 includes driver circuits 100 to 102, a high-side switching element 103 and a low-side switching element 104. The driver circuits 100 to 102, high-side switching element 103 and low-side switching element 104 are the same as the driver circuits 31 to 33, high-side switching element 34 and low-side switching element 35 of the first embodiment, and are not described here again.

The input terminal of the driver circuit 100 is connected, via the HSI terminal, to the output terminal of the microcomputer 9 that produces a signal HIS for controlling the high-side switching element 103. The output terminal thereof is connected to the gate of the high-side switching element 103. Further, the input terminal of the driver circuit 101 is connected, via the LSI terminal, to the output terminal of the microcomputer 9 that produces a signal LSI for controlling the low-side switching element 104. The output terminal thereof is connected to the gate of the low-side switching element 104. Further, the input terminal of the driver circuit 102 is connected, via the TRDI terminal, to the output terminal of the microcomputer 9 that produces a signal TRDI for controlling the safety switching element 4. The output terminal thereof is connected to the gate of the safety switching element 4 via the TRDO terminal.

Figure 5:
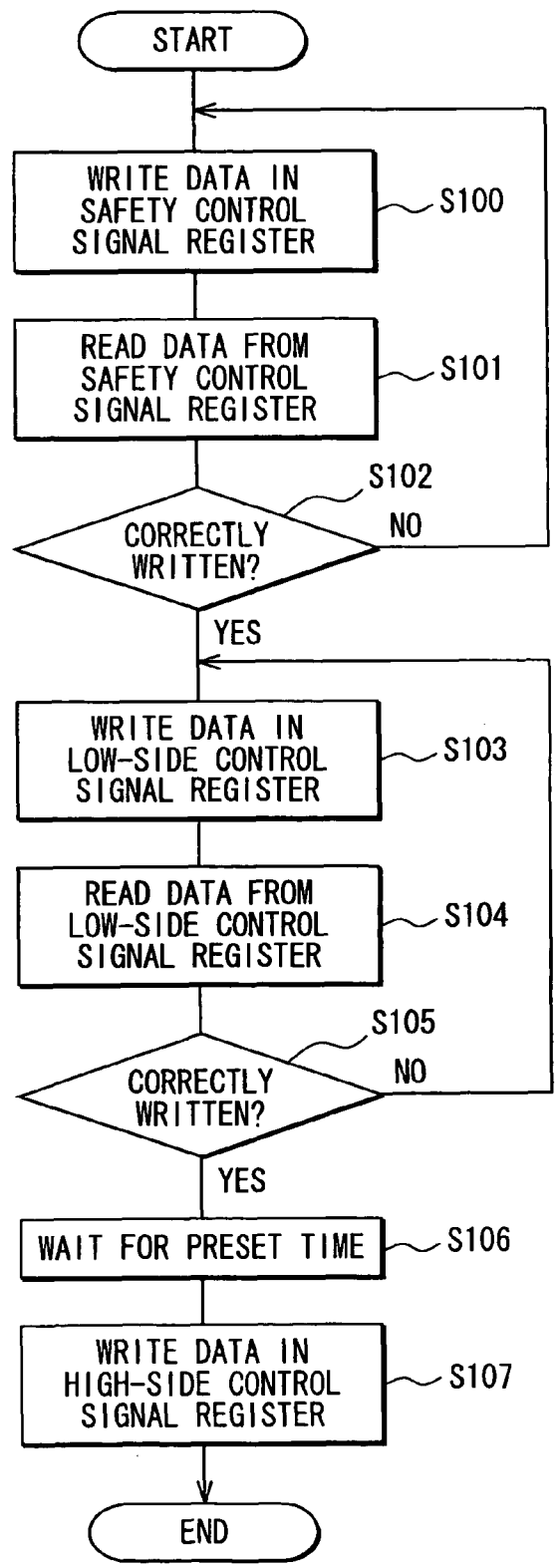
FIG. 5 is a flowchart of processing executed in the airbag device of FIG. 4.

The microcomputer 9 is programmed to perform the processing shown in FIG. 5.

When the electric power is supplied, the airbag device 8 starts operating. The microcomputer 9 checks if the vehicle has collided based on an output of the collision sensor 1a. If it is determined that the vehicle has collided, the microcomputer 9 writes a predetermined data into a safety switching element control signal register (S100). Therefore, a signal TRDI for controlling the safety switching element 4 is output. Thereafter, the microcomputer 9 reads the data of the safety switching element control signal register (S100). The microcomputer 9 checks if the data has been correctly written (S102).

If the data has not been correctly written, the routine returns to step S100. If the data has been correctly written, the microcomputer 9 so determines that the signal is output for controlling the safety switching element 4, and writes a predetermined data into the low-side switching element control signal register (S103). Therefore, a signal LSI for controlling the low-side switching element is output. Thereafter, the microcomputer 9 reads the data of the low-side switching element control signal register (S104). The microcomputer 9 checks if the data has been correctly written (S105).

If the data has not been correctly written, the routine returns to step S103. If the data has been correctly written, the microcomputer 9 so determines that the signal is output for controlling the low-side switching element, and waits for the passage of a preset period of time (S106). Here, the preset period of time is set to be longer than the turn-on times T1s, Ttrd of the low-side switching element 104 and of the safety switching element 4. It is therefore presumed that the low-side switching element 104 and the safety switching element 4 remain turned on even after the passage of the preset period of time. Thereafter, the microcomputer 9 writes a predetermined data into the high-side switching element control register (S107). Therefore, a signal HIS for controlling the high-side switching element 103 is output, so that the high-side switching element 103 is turned on last.

According to the third embodiment, the microcomputer 9 performs the function of generating control signals, which is performed by the control signal generating circuit 30 in the first embodiment. Therefore, the airbag control IC 10 can be simplified.

Fourth Embodiment

Figure 6:
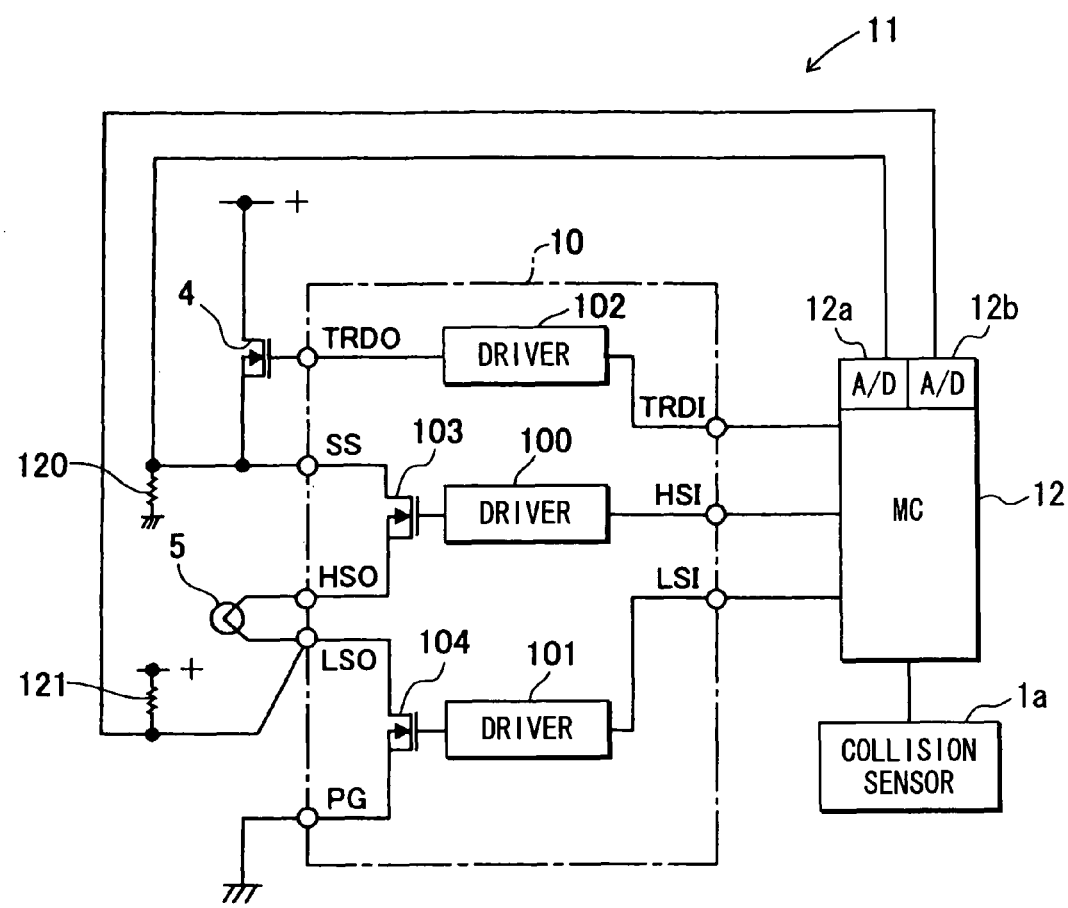
FIG. 6 is a circuit diagram of an airbag device according to a fourth embodiment of the present invention.

As shown in FIG. 6, an airbag device 11 according to a fourth embodiment includes a microcomputer 12, the airbag control IC 10, the safety switching element 4 and the squib 5. The microcomputer 12 is equipped with two A/D converters 12a, 12b. An input terminal of one A/D converter 12a is grounded via a resistor 120 and is, further, connected to the SS terminal of the airbag control IC 10. An input terminal of the other A/D converter 12b is connected to the power source via a resistor 121 and is, further, connected to the LSO terminal.

Figure 7:
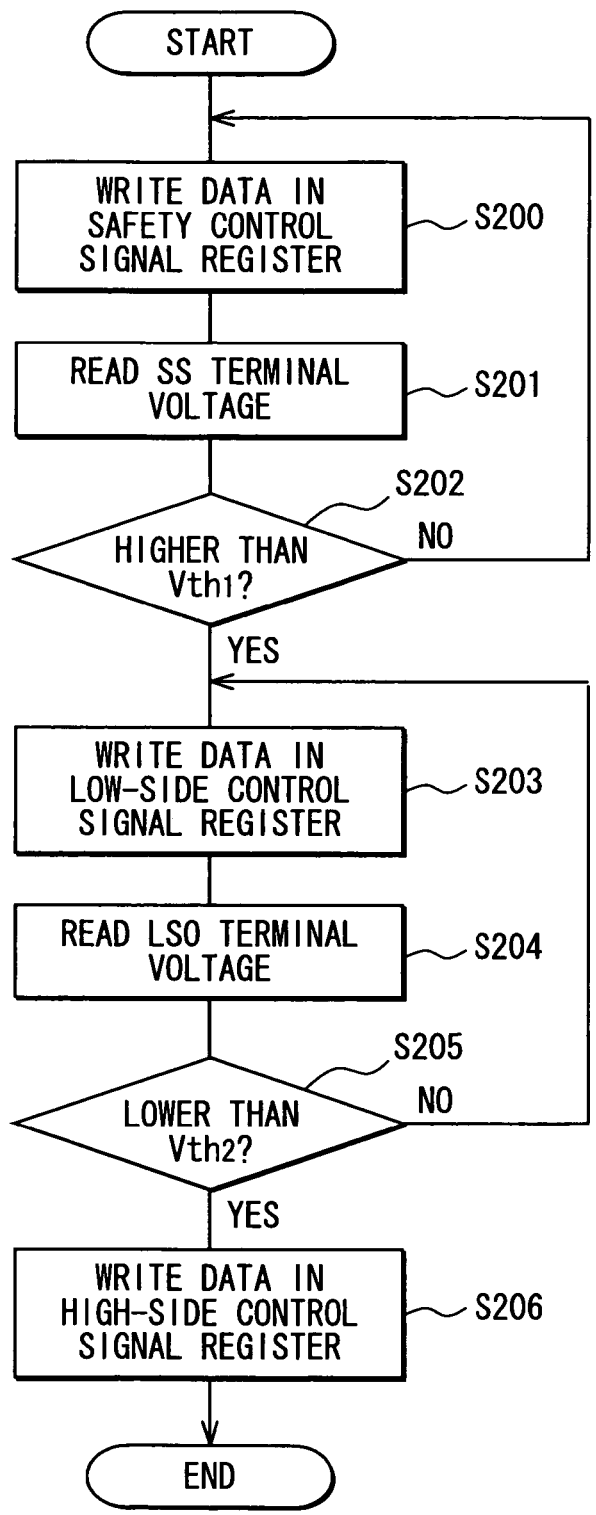
FIG. 7 is a flowchart of processing executed in the airbag device of FIG. 6.

When the electric power is supplied, the airbag device 11 starts operating to perform the processing shown in FIG. 7. The microcomputer 12 checks if the vehicle has collided based on an output of the collision sensor 1a. If it is determined that the vehicle has collided, the microcomputer 12 writes a predetermined data into a safety switching element control signal register (S200). Therefore, a signal TRD1 for controlling the safety switching element 4 is output. Thereafter, the microcomputer 12 reads the voltage at the SS terminal (S201) applied to the A/D converter 12a. The microcomputer 12 checks if the voltage that is read at the SS terminal is exceeding a first predetermined threshold value (S202). Here, the first predetermined threshold value for the voltage at the SS terminal is set to a value Vth1 with which it is determined that the safety switching element 4 is turned on.

If the voltage at the SS terminal is not larger than the predetermined threshold value Vss, the routine returns to step S200. If the voltage at the SS terminal is higher than the predetermined threshold value, on the other hand, the microcomputer 12 so determines that the safety switching element 4 is turned on, and writes a predetermined data into the low-side switching element control signal register (S203). Therefore, a signal LSI for controlling the low-side switching element is output. Thereafter, the microcomputer 12 reads the voltage at the LSO terminal (S204). The microcomputer 12 checks if the voltage read at the LSO terminal is smaller than a second predetermined threshold value (S205). Here, the second predetermined threshold value for the voltage at the LSO terminal is set to a value Vth2 with which it is determined that the low-side switching element 104 is turned on.

If the voltage at the LSO terminal is not smaller than the second predetermined value Vth2, the routine returns to step S203. If the voltage at the LSO terminal is smaller than the second predetermined threshold value Vth2, on the other hand, the microcomputer 12 so determines that the low-side switching element 104 is turned on and writes a predetermined data into the high-side switching element control signal register (S206). Therefore, the signal HIS for controlling the high-side switching element 103 is output, and the high-side switching element 103 is turned on last.

According to the fourth embodiment, the control signal generating circuit 70 in the second embodiment need not have the control signal generating circuit 70 in the form of hardware in the airbag control IC 7. Therefore, the airbag control IC 10 can be simplified.

The above embodiments may be modified in various ways without departing from the spirit of the invention. For instance, the squib may be replaced with other electrical actuators for driving various devices other than the airbag device.

What is claimed is:

1. A device for protecting a passenger in a vehicle comprising:
   a squib which is ignited when an electric current flows thereto;
   a plurality of switching elements connected in series with the squib, at least one of the switching elements being a current control switching element for controlling the electric current to a predetermined value, other switching elements of the plurality of switching elements being not current control switching elements; and
   control means for controlling the current control switching element so that a predetermined electric current flows into the squib,
   wherein the control means turns on the current control switching element after the other switching elements have been turned on.

2. The device according to claim 1, wherein the plurality of switching elements includes three switching elements, and the current control switching element is connected to the squib.

3. The device according to claim 1, wherein the control means detects actual turn-on state of the plurality of switching elements except the current control switching element and determines a turn-on timing of the current control switching element based on the detected actual turn-on state.

4. The device according to claim 1, wherein the control means includes a delay section that delays turning on the current control switching element for a predetermined delay time from turning on the other switching elements.

5. A device for protecting a passenger in a vehicle comprising:
   a squib that is ignited when an electric current flows thereto;
   a first switching element connected to a terminal of the squib;
   a second switching element connected to the other terminal of the squib to ground the squib;
   a safety switching element, arranged between a power source and the first switching element, for connecting the power source to the first switching element; and
   control means for controlling the first switching element so that a predetermined electric current flows into the squib,
   wherein the first switching element is a current controlling element, and the second switching element and the safety switching element are not current controlling elements, and
   wherein the control means turns on the first switching element after the safety switching element and the second switching element have been turned on.

6. The device according to claim 5, wherein the control means controls the second switching element and the safety switching element.

7. The device according to claim 6, wherein the control means produces control signals for turning on the second switching element and the safety switching element, and, after passage of turn-on times of the second switching element and the safety switching element, produces a control signal for turning on the first switching element.

8. The device according to claim 6, wherein the control means produces control signals for turning on the second switching element and the safety switching element, and, after the second switching element and the safety switching element have been turned on, produces a control signal for turning on the first switching element.

9. The device according to claim 8, wherein the control means detects actual turn-on states of the second switching element and the safety switching element based upon a terminal voltage of the second switching element at a point connected to the squib and upon a terminal voltage of the safety switching element at a point connected to the first switching element.

10. A device for protecting a passenger in a vehicle comprising:
    a power source;
    a collision sensor that generates an output indicative of a collision of a vehicle;
    an electric actuator that is driven to protect a passenger when an electric current is supplied thereto;
    a plurality of switching elements connected in series with the electric actuator and turned on to supply the electric current to the electric actuator; and
    a control unit connected between the collision sensor and the plurality of switching elements to turn on the switching elements in response to the output of the collision sensor,
    wherein the control unit is constructed to turn on the plurality of switching elements at different time points in response to the output of the collision sensor, and
    wherein the plurality of switching elements includes three switching elements, two of which are connected to one and the other sides of the electric actuator, respectfully, and one of the two switching elements has a current control function and is turned on last among the three switching elements.

11. The device according to claim 10, wherein the control unit includes a delay section that delays turning on a first one of the plurality of switching elements for a predetermined delay time from turning on a second one of the plurality of switching elements in response to the output of the collision sensor.

12. The device according to claim 11, wherein:
    the switching elements are transistors; and
    the predetermined delay time is set longer than a turn-on time required for the transistor to turn on.

13. The device according to claim 10, wherein:
    the plurality of switching elements includes a first switching element and a second switching element connected to a high-potential side and a low-potential side of the electric actuator, respectively; and
    the control unit includes a voltage detecting section for detecting actual voltages produced by the first switching element and the second switching element to turn on the first switching element after the second switching element has been turned on.

14. The device according to claim 10, wherein two of the three switching elements other than the one of the two switching elements have no current control function.

15. A device for protecting a passenger in a vehicle comprising:
    a squib that is ignited when an electric current flows thereto;
    a first switching element connected to a terminal of the squib;
    a second switching element connected to the other terminal of the squib to ground the squib;

a safety switching element, arranged between a power source and the first switching element, for connecting the power source to the first switching element; and control means for controlling the first switching element so that a predetermined electric current flows into the squib, and for controlling the second switching element and the safety switching element, wherein the control means turns on the first switching element after the safety switching element and the second switching element have been turned on, wherein the control means produces control signals for turning on the second switching element and the safety switching element, and, after the second switching element and the safety switching element have been turned on, produces a control signal for turning on the first switching element, and wherein the control means detects actual turn-on states of the second switching element and the safety switching element based upon a terminal voltage of the second switching element at a point connected to the squib and upon a terminal voltage of the safety switching element at a point connected to the first switching element.

* * * * *